(12) United States Patent
Lin et al.

(10) Patent No.: US 6,366,791 B1
(45) Date of Patent: Apr. 2, 2002

(54) SYSTEM AND METHOD FOR PROVIDING A MUSICAL RINGING TONE ON MOBILE STATIONS

(75) Inventors: Janette Chen Lin, Dallas; David Boltz, Garland; Walt Evanyk, Plano, all of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/336,427

(22) Filed: Jun. 17, 1999

(51) Int. Cl.[7] .................................................. H04B 1/38
(52) U.S. Cl. ........................ 455/567; 455/466; 455/412; 379/373.01; 379/373.02; 379/373.04
(58) Field of Search ................................. 455/403, 412, 455/414, 418, 433, 466, 567; 379/373.01–373.05

(56) References Cited

U.S. PATENT DOCUMENTS

| | | | | |
|---|---|---|---|---|
| 4,866,766 A | * | 9/1989 | Mitzlaff | 379/373.02 |
| 4,868,561 A | * | 9/1989 | Davis | 379/373.02 |
| 5,452,354 A | * | 9/1995 | Kyronlahti et al. | 379/373.02 |
| 5,724,411 A | * | 3/1998 | Eisdorfer et al. | 379/373.02 |
| 5,870,683 A | * | 2/1999 | Wells et al. | 455/566 |
| 5,987,323 A | * | 11/1999 | Huotari | 455/433 |
| 6,094,587 A | * | 7/2000 | Armanto et al. | 455/566 |
| 6,138,006 A | * | 10/2000 | Foti | 455/414 |

* cited by examiner

*Primary Examiner*—William Trost
*Assistant Examiner*—Simon Nguyen
(74) *Attorney, Agent, or Firm*—Jenkens & Gilchrist, P.C.

(57) ABSTRACT

A telecommunications system and method is disclosed for allowing network operators to download ringing tone pattern (s) associated with one or more musical scores to mobile stations (MSs) according to the music selection of mobile subscribers associated with the MSs. Once executed, the ringing tone pattern provides a musical ringing tone on the MS, instead of the normal ringing tone. In addition, ringing tone patterns can be used to enhance the "distinctive ringing" function within the MS. Thus, instead of using distinctive ringing patterns to represent different called party numbers, different music can be used.

31 Claims, 5 Drawing Sheets

Musical Ringing Tone Database in HLR

| Phone Model | Music | Ringing tone programming pattern |
|---|---|---|
| Ericsson DF380 | Titanic | X-A-3--3-2---1-1-2-2--5-7----B-7-6-6-Z |
| Ericsson AF780 | Titanic | X-A-B-3--3-2---1-1-2-2--5-7----A-B-7-6-6-Z-X-Y |
| ... | ... | ..... |
| Ericsson AF880 | Walking in the Rain | X-A---1-2-1-3-7-7--5-4----D-7-3-6-U |

FIG. 4

SYSTEM AND METHOD FOR PROVIDING A MUSICAL RINGING TONE ON MOBILE STATIONS

BACKGROUND OF THE PRESENT INVENTION

1. Field of the Invention

The present invention relates generally to telecommunications systems and methods for ringing mobile stations within a cellular network, and specifically to providing network ringing options to mobile subscribers.

2. Background of the Present Invention

Cellular telecommunications is one of the fastest growing and most demanding telecommunications applications. Today, it represents a large and continuously increasing percentage of all new telephone subscriptions around the world. There are currently two types of radio frequency access technologies for cellular systems: analog and digital technologies. Two common digital systems are the Digital Advanced Mobile Phone System (D-AMPS) and the Global System for Mobile Communication (GSM) system, which is perhaps the most widely used digital mobile cellular radio system.

With reference now to FIG. 1 of the drawings, a sample GSM Public Land Mobile Network (PLMN) 10 is illustrated. The PLMN 10 is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a Mobile Station (MS) 20 may move freely without having to send update location information to the MSC/VLR area 12 that controls the LA 18. Each LA 12 is also divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS 24 is the physical equipment, illustrated for simplicity as a radio tower, that provides radio coverage to the geographical part of the cell 22 for which it is responsible. It should be understood that the BSC 23 may be connected to several BTSs 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the MSs 20 currently located within the MSC/VLR area 12. If an MS 20 roams into a new MSC/VLR area 12, the VLR 16 connected to that MSC 14 will request data about that MS 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

A current popular trend is to program the MS 20 to ring with popular music, instead of the normal ringing tone. There is a series of books published by Futabasha Publishers Ltd., such as the book entitled "Ringing-tone for Cellular Phones, Do Re Mi" that teaches mobile subscribers how to program the musical ringing tone(s) into their MSs 20. For example, a mobile subscriber can program his or her MS 20 to ring with a popular song by inputting symbols and/or numbers into his or her MS 20.

However, programming the MS 20 directly by the mobile subscriber is not easy. Different MSs 20 require different programming methods. Thus, if a mobile subscriber purchases a new MS 20, the programming technique used before may not work anymore. Therefore, many mobile subscribers may want the option of an alternative ringing tone without having to buy a book and program the MS 20 by themselves.

In addition, with the demand for alternative ringing tones rising, many network operators are looking for ways to capitalize on this trend. By allowing the mobile subscribers to program the musical tones into their MSs 20 themselves, the network operators are losing out on a potential source of revenue.

SUMMARY OF THE INVENTION

The present invention is directed to telecommunications systems and methods for allowing network operators to download ringing tone pattern(s) associated with one or more musical scores to mobile stations (MSs) according to the musical score selection of mobile subscribers associated with the MSs. Once executed, the ringing tone pattern provides a musical ringing tone on the MS, instead of the normal ringing tone. In addition, ringing tone patterns can be used to enhance the "distinctive ringing" function within the MS. Thus, instead of using distinctive ringing patterns to represent different called party numbers, different music can be used.

BRIEF DESCRIPTION OF THE DRAWINGS

The disclosed invention will be described with reference to the accompanying drawings, which show important sample embodiments of the invention and which are incorporated in the specification hereof by reference, wherein:

FIG. 4 illustrates a database for storing the ringing tone pattern; and

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
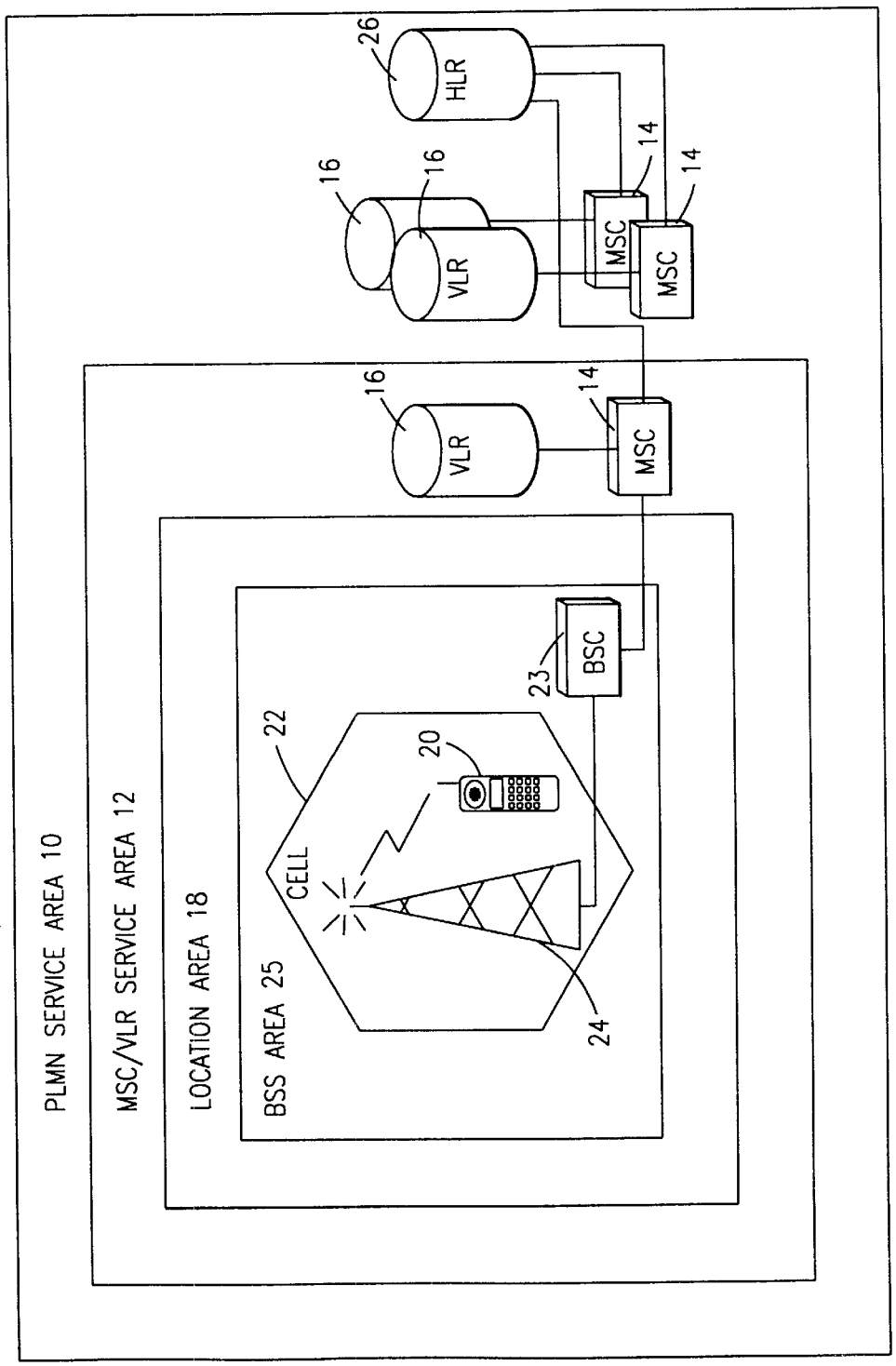
FIG. 1 is a block diagram of a sample Global System for Mobile Communications cellular network.
Figure 2:
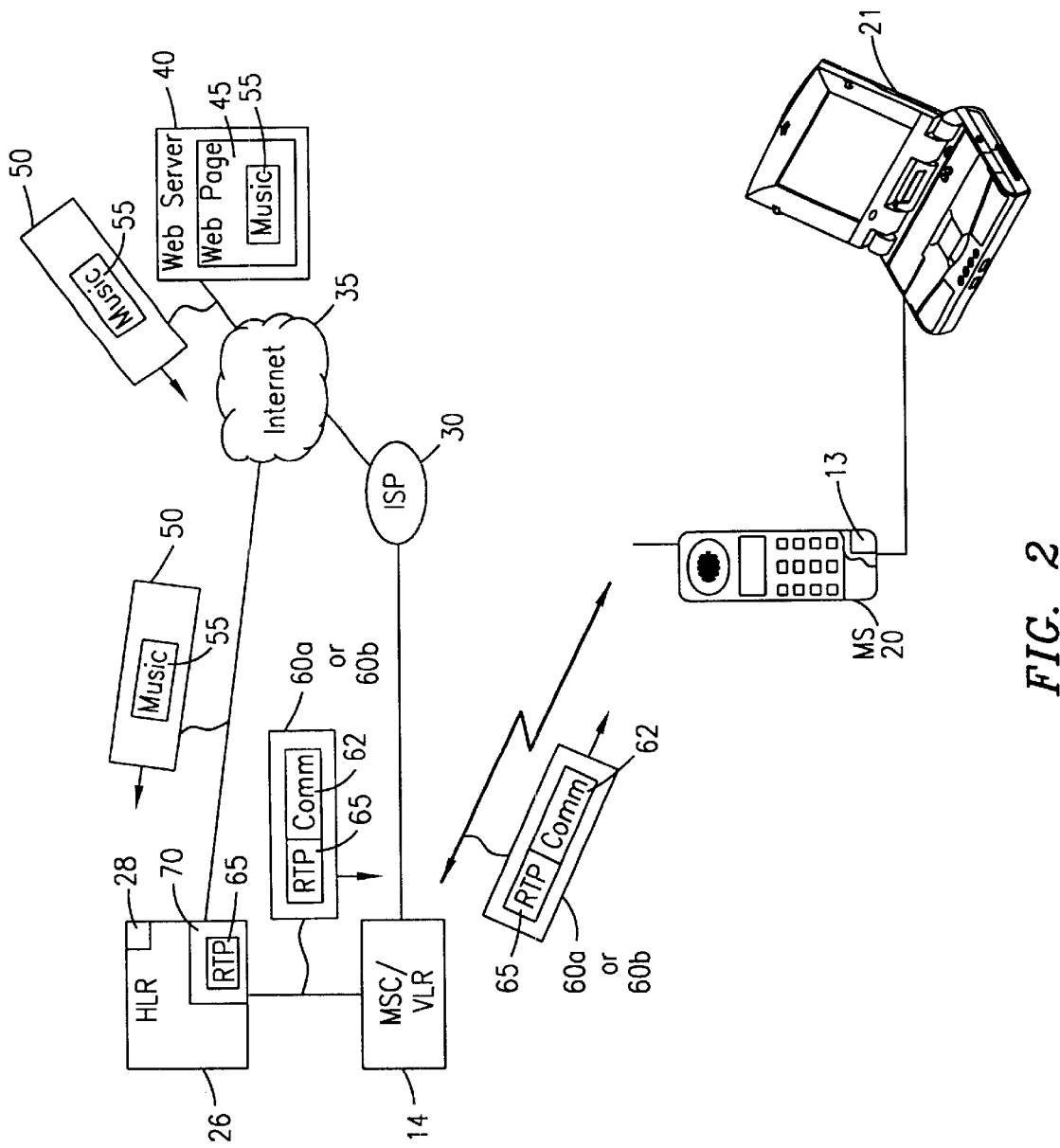
FIG. 2 illustrates the downloading of a ringing tone pattern to a mobile station to provide a musical ringing tone on the mobile station.

With reference now to FIG. 2 of the drawings, network operators can offer a musical ringing tone feature to mobile subscribers to allow mobile subscribers to select musical scores 55 for the ringing tone of their Mobile Stations (MSs) 20, without the need for the mobile subscribers to program their MSs 20 themselves. In order to automatically program the MS 20 to ring with the music score 55 selection(s) of a mobile subscriber, ringing tone patterns 65 associated with the selected musical score(s) 55 can be downloaded to the MS 20. When implemented on the MS 20, the ringing tone patterns 65 provide a musical ringing tone corresponding to the selected musical score 55, instead of the normal ringing tone.

In order to download the desired ringing tone patterns 65, the mobile subscriber can either call the network operator to select the desired musical score 55 or access the network operator through an Internet 35, the latter being illustrated. For example, the mobile subscriber can access a web page 45 of the network operator from a stand-alone computer 21 or from the MS 20 that has either a laptop computer 21 attached to it, as is shown, or a computer 21 integrated with it.

As shown in FIG. 2, if the MS 20 with the attached computer 21 wants to access the web page 45 of the network operator that provides different popular musical score 55 selections for ringing tones, the MS 20 can dial a number associated with an Internet Service Provider (ISP) 30, or other entity providing access to the Internet 35 to establish a call connection with the ISP 30 via a Mobile Switching Center (MSC) 14, which is a combined MSC/Visitor Location Register (VLR), serving the MS 20. Thereafter, the mobile subscriber can enter on the computer 21 a Universal Resource Locator (URL) (not shown) identifying the web page 45 of the network operator. This URL is transmitted to the ISP 30 via the MS 20 and the MSC 14. The ISP 30, using the entered URL, routes the call through the Internet 35 to a web server 40 storing the requested web page 45 and establishes a connection with that web server 40.

Once the web page 45 is located, the web page 45 is downloaded through the Internet 35 onto the computer 21. At this point, the mobile subscriber can access a subscriber record 28 associated with the MS 20 that is stored on the web page 45 or within in a Home Location Register (HLR) 26, the latter being illustrated, and select the desired musical score(s) 55 based upon the model number of the MS 20 to receive the selected musical score(s) 55. The model number of the MS 20 is preferably provided by the mobile subscriber. However, in some cases, the subscriber record 28 may store MS 20 model number information.

It should be understood that prior to allowing the mobile subscriber to access the subscriber record 28, the identity of the mobile subscriber is first authenticated. Fees for each musical score 55 can be displayed to the mobile subscriber on the computer 21, and acceptance of these fees provided by the mobile subscriber to the network operator via the web page 45 prior to initiating downloading of the selected musical score(s) 55.

Once selected and confirmed, the network operator sends a message 50 to the HLR 26 associated with the MS 20, instructing the HLR 26 to download the selected musical score(s) 55 to the MS 20 from the web page 45. As is shown, this message 50 could be sent from the web page 45 through the Internet 35. In response to the message 50, the HLR 26 retrieves the ringing tone pattern 65 associated with the selected musical scores(s) 55 from a database 70 therein and downloads this ringing tone pattern 65 to the MS 20. Alternatively, the web page 45 itself could download the selected musical score(s) 55 to the MS 20. In this case, the musical score(s) 55 could be stored within the web page 45 or within a node (not shown) accessible to the web page 45.

If the MS 20 is within the Global System for Mobile Communications (GSM) system, the MS 20 has a memory 13 therein, such as a Subscriber Identity Module (SIM) card, for storing subscriber related information. Therefore, as an example, in the GSM system, this ringing tone pattern 65 can be downloaded to the MS 20 using a SIM Application Toolkit (SAT) download procedure. A new SIM AN;4 command and/or parameter 62 along with the ringing tone pattern 65 can be sent from the HLR 26 or the web page 45 to the MS 20 using a Short Message Service (SMS) message 60a or Unstructured Supplementary Service Data (USSD) message 60b via the MSC/VLR 14 serving the MS 20. It should be understood that if an SMS message 60a is sent, the SMS message 60a is sent to the MSC/VLR 14 from a Short Message Service Center (SMSC) (not shown). Once received, the new SIM command or parameter 62 triggers the SIM card 13 within the MS 20 to program the ringing of the MS 20 according to the received ringing tone pattern 65.

The above solution applies to GSM systems. However, it should be understood that the downloading of ringing tone patterns 65 to MSs 20 can be implemented within any type of cellular system. For example, within the Digital Advance Mobile Phone System (D-AMPS), instead of using a SIM Application Toolkit download procedure, the ringing tone pattern 65 can be downloaded from the HLR 26 to the memory 13 within the MS 20 using, for example, an SMS message 60a.

Figure 3:
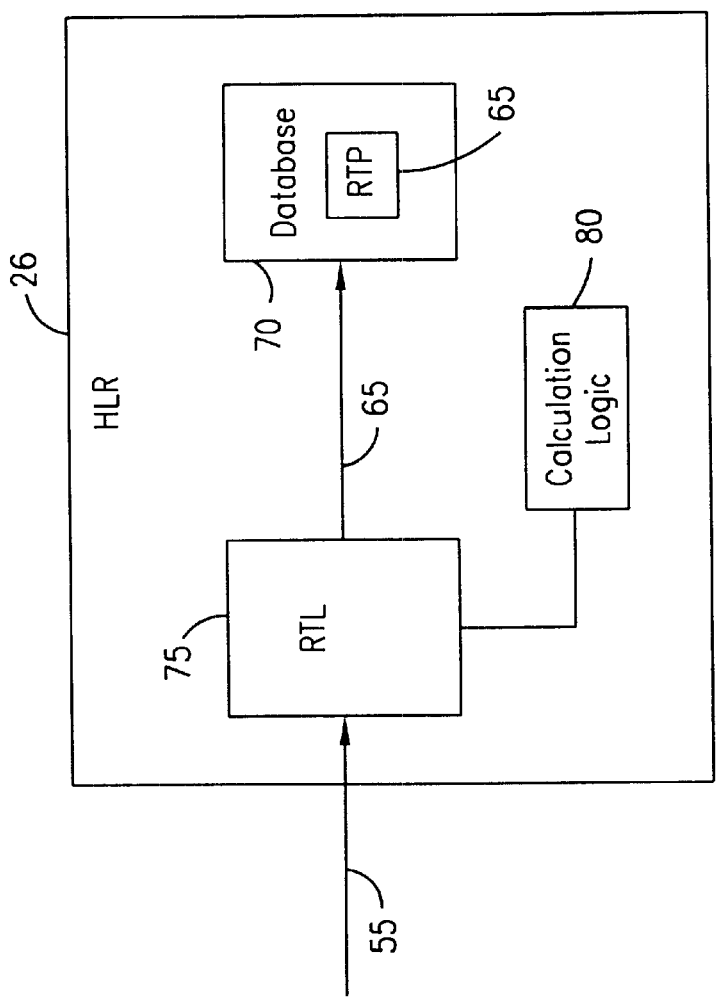
FIG. 3 illustrates a home location register for calculating, storing and downloading the ringing tone pattern.

With reference now to FIG. 3 of the drawings, preferably, a database 70 within the web page 45 (shown in FIG. 2) or the HLR 26, the latter being illustrated, contains the ringing tone patterns 65 for each available musical score 55. Once the network operator selects the musical scores 55 and provides these to ringing tone logic 75 within the HLR 26, the ringing tone logic 75 accesses calculation logic 80 within the HLR 26 to calculate the ringing tone patterns 65 for each of these musical scores 55 for each type of MS 20. Once calculated, the ringing tone logic 75 stores each of these calculated ringing tone patterns 65 within the database 70. It should be understood that the database 70 can be located within the HLR 26, within the web page 45 or within a separate node (not shown) accessible by the web page 45 or HLR 26 through, for example, a Service Control Point (SCP) (not shown) if the ringing tone feature is an Advanced Intelligent Network (AIN) feature.

An example of the type of information stored in the database 70 is shown in FIG. 4 of the drawings. In a first column 72, there is a listing of model numbers 74 for MSs 20. In a second column 76, each musical score 55 is listed for each of the MS model numbers 74 listed in the first column 72. Finally, in a third column 78, the calculated ringing tone pattern 65 for the associated musical score 55 and MS model number 74 is listed. The ringing tone logic 75 within the HLR 26 indexes on the requesting MS 20 model number 74, which is determined from the subscriber record 28 associated with the requesting MS 20 or provided by the mobile subscriber, and the selected musical score 55 associated with that model number 74 to retrieve the ringing tone pattern 65 to be downloaded to the MS 20.

Figure 5:
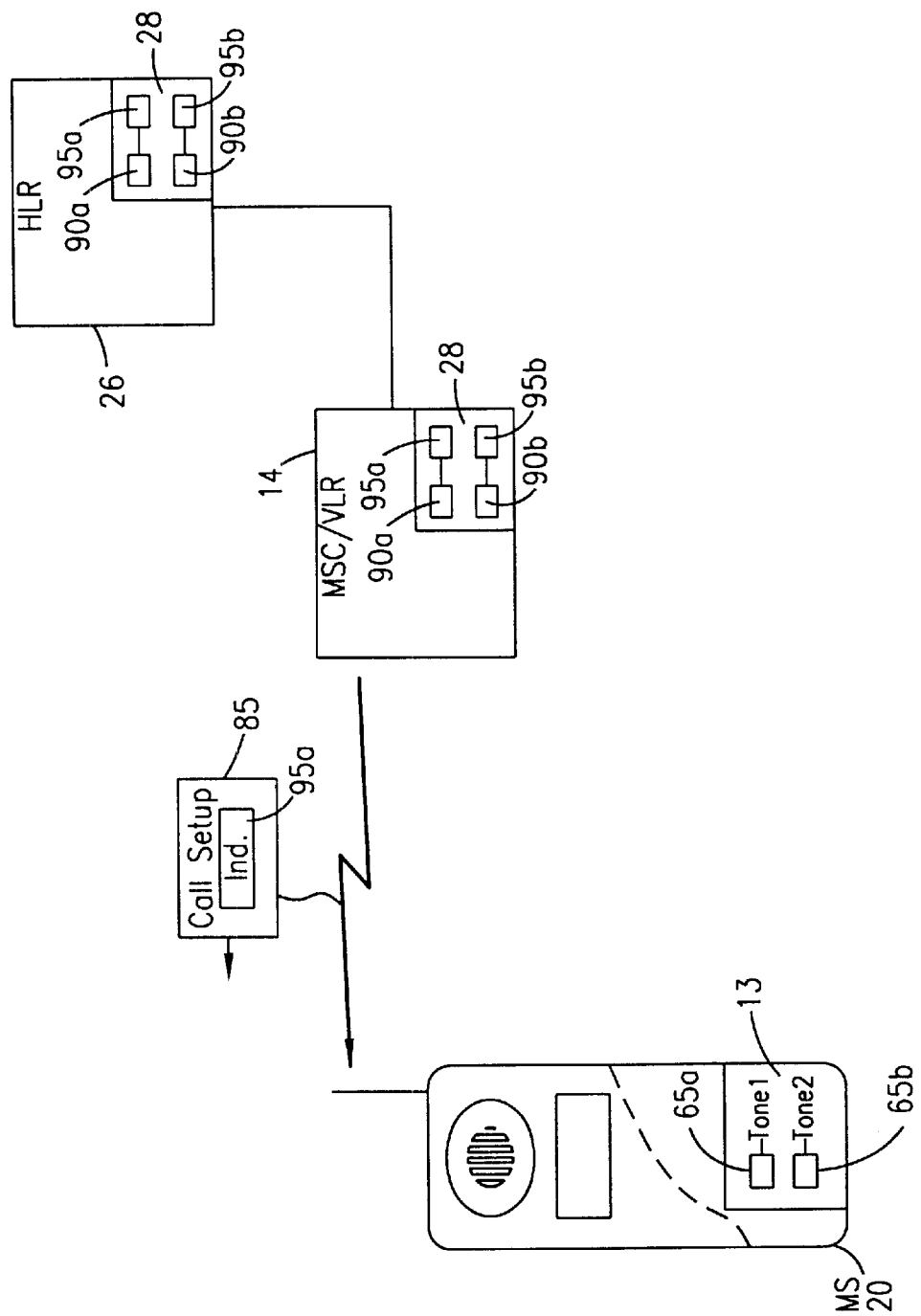
FIG. 5 illustrates a distinctive ringing function on the mobile station using the ringing tone pattern.

With reference now to FIG. 5 of the drawings, in an alternative embodiment, the downloading of ringing tone patterns 65 can be used to enhance the "distinctive ringing" function available on MSs 20. Today, many network operators support multiple types of ringing patterns to distinctively identify different called party numbers associated with the same mobile subscriber. For example, one MS 20 may have two phone numbers, X and Y, associated with it. When someone reaches the MS 20 with the number X, the MS 20 rings with one ringing pattern, whereas when someone reaches the same MS 20 with the other number, Y, the MS 20 rings with a different pattern. Judging from the ringing pattern, the mobile subscriber can tell which number he/she is reached by.

By applying the present invention to the existing distinctive ringing function, instead of using distinctive ringing patterns to represent different called party numbers, different music can be used. Therefore, the mobile subscriber can call the network operator or access the web page (45 shown in FIG. 2) associated with the network operator and select a different musical score 55 for each B-number 90 (called party number) associated with the MS 20. The different ringing tone patterns 65 associated with each of the selected musical scores 55 can be downloaded to the MS 20, along with an indication of the associated B-number 90.

For example, if the MS 20 has two B-numbers 90a and 90b associated with it, the HLR 26 could download via the MSC/VLR 14 a first ringing tone pattern 65a associated with a first musical score 55a to the memory 13 within the MS 20, and instruct the MS 20 to label it "Tone 1." Thereafter, the HLR 26 can download a second ringing tone pattern 65b associated with a second musical score 55b to the MS 20, and instruct the MS 20 to label it "Tone 2." In addition, within the subscriber record 28 associated with the MS 20, the HLR 26 can store a first indication 95a that "Tone 1" should be used for the first B-number 90a and a second indication 95b that "Tone 2" should be used for the second B-number 90b.

When the MS 20 registers with a serving MSC/VLR 14, these indications 95a and 95b and associated B-numbers 90a and 90b, respectively, are also stored within the MSC/VLR 14. Thus, when an incoming call is received by the MSC/VLR 14 to one of the B-numbers 90a or 90b, which in FIG. 5 is the first B-number 90a, the MSC/VLR 14 includes in a call setup message 85 to the MS 20 the first indication 95a to use "Tone 1" to ring the MS 20. When the MS 20 uses the first ringing tone pattern 65a to ring with the musical score 55a associated with "Tone 1," the mobile subscriber realizes that the incoming call is directed to the first B-number 90a.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for providing a musical ringing tone on a mobile station within a cellular network, comprising:

a database for storing a plurality of ringing tone patterns, each of said ringing tone patterns being associated with one of a plurality of musical scores and calculated for each of a plurality of different mobile station types; and a node for receiving a select one of said plurality of musical scores from a mobile subscriber associated with said mobile station, accessing said database to retrieve a select one of said plurality of ringing tone patterns associated with said select musical score and said mobile station type of said mobile station and downloading said select ringing tone pattern to said mobile station.

2. The telecommunications system of claim 1, wherein said mobile station further comprises:

a memory for storing said select ringing tone pattern.

3. The telecommunications system of claim 2, wherein said memory is a Subscriber Identity Module card.

4. The telecommunications system of claim 3, wherein said node transmits a parameter to said Subscriber Identity Module card within said mobile station instructing said Subscriber Identity Module card to program the ringing of said mobile station with said select ringing tone pattern.

5. The telecommunications system of claim 4, wherein said parameter is included within a Short Message Service message.

6. The telecommunications system of claim 4, wherein said parameter is included within an Unstructured Supplementary Service Data message.

7. The telecommunications system of claim 1, wherein said database further comprises a plurality of mobile station model numbers, each of said mobile station model numbers having each of said musical scores associated therewith, each of said ringing tone patterns associated with each of said musical scores being different for each of said mobile station model numbers.

8. The telecommunications system of claim 7, wherein said mobile station has a select mobile station model number associated therewith, said select ringing tone pattern being associated with said select mobile station model number.

9. The telecommunications system of claim 1, wherein said node is a home location register, said database being located within said home location register.

10. The telecommunications system of claim 1, wherein said node further calculates each of said ringing tone patterns using said respective musical scores and stores said ringing tone patterns within said database.

11. The telecommunications system of claim 1, wherein said mobile station provides said musical ringing tone on said mobile station using said select ringing tone pattern in response to receiving an incoming call to said mobile station.

12. The telecommunications system of claim 1, wherein said mobile station has at least two B-numbers associated therewith, said node downloading at least said select ringing tone pattern for a first one of said at least two B-numbers and a second one of said ringing tone patterns associated with a second musical score for a second one of said at least two B-numbers.

13. The telecommunications system of claim 12, further comprising:

a home location register for storing a subscriber record associated with said mobile station, said subscriber record storing a first indication to use said select ringing tone pattern associated with said first B-number and a second indication to use said second ringing tone pattern associated with said second B-number.

14. The telecommunications system of claim 13, further comprising:

a mobile switching center in wireless communication with said mobile station for receiving an incoming call to a select one of said at least two B-numbers associated with said mobile station, said first and second indications being downloaded to said mobile switching center from said home location register, said mobile switching center transmitting a select one of said first and second indications associated with said select B-number to said mobile station, said mobile station using said select indication to provide said musical ringing tone associated with said select B-number on said mobile station.

15. The telecommunications system of claim 1, wherein said node is a web page associated with said cellular network.

16. A method for providing a musical ringing tone on a mobile station within a cellular network, comprising the steps of:

storing within a database a plurality of ringing tone patterns, each of said ringing tone patterns being associated with one a plurality of musical scores and calculated for each of a plurality of different mobile station types;

receiving, at a node, a select one of said plurality of musical scores from a mobile subscriber associated with said mobile station;

retrieving, by said node, from said database a select one of said plurality of ringing tone patterns associated with said select musical score and said mobile station type of said mobile station; and downloading said select ringing tone pattern from said node to said mobile station.

17. The method of claim 16, wherein said step of downloading further comprises the step of:

storing said select ringing tone pattern within-a memory in said mobile station.

18. The method of claim 17, wherein said step of downloading further comprises the step of:

transmitting a parameter to said memory within said mobile station instructing said memory to program the ringing of said mobile station with said select ringing tone pattern.

19. The method of claim 16, wherein said step of storing further comprises the step of:

storing within said database a plurality of mobile station model numbers, each of said mobile station model numbers having each of said musical scores associated therewith, each of said ringing tone patterns associated with each of said musical scores being different for each of said mobile station model numbers.

20. The method of claim 17, wherein said mobile station has a select mobile station model number associated therewith, said step of retrieving further comprising the step of:

retrieving said select ringing tone pattern associated with said select mobile station model number.

21. The method of claim 16, wherein said step of storing further comprises the step of:

calculating each of said ringing tone patterns using said respective musical scores.

22. The method of claim 16, further comprising the step of:

providing said musical ringing tone on said mobile station using said select ringing tone pattern in response to receiving an incoming call to said mobile station.

23. The method of claim 16, wherein said mobile station has at least two B-numbers associated therewith, said step of downloading further comprising the steps of:

downloading said select ringing tone pattern for a first one of said at least two B-numbers; and downloading a second one of said ringing tone patterns associated with a second musical score for a second one of said at least two B-numbers.

24. The method of claim 23, further comprising the steps of:

storing within a subscriber record within a home location register associated with said mobile station a first indication to use said select ringing tone pattern associated with said first B-number; and storing within said subscriber record a second indication to use said second ringing tone pattern associated with said second B-number.

25. The method of claim 24, wherein said step of providing further comprises the steps of:

downloading said first and second indications from said home location register to a mobile switching center in wireless communication with said mobile station; and receiving an incoming call to a select one of said at least two B-numbers associated with said mobile station.

26. The method of claim 25, wherein said step of providing further comprises the steps of:

transmitting a select one of said first and second indications associated with said select B-number from said mobile switching center to said mobile station; and providing said musical ringing tone associated with said select B-number on said mobile station using said select indication.

27. The method of claim 16, wherein said step of receiving further comprises the steps of:

receiving said select musical score at a web page associated with said cellular network.

28. A home location register for downloading a musical ringing tones to a mobile station, comprising:

a database for storing a plurality of ringing tone patterns, each of said ringing tone patterns being associated with one of a plurality of musical scores and calculated for each of a plurality of different mobile station types; and ringing tone logic for receiving a select one of said plurality of musical scores from a mobile subscriber associated with said mobile station, accessing said database to retrieve a select one of said plurality of ringing tone patterns associated with said select musical score and said mobile station type of said mobile station and downloading said select ringing tone pattern to said mobile station.

29. The home location register of claim 28, wherein said database further comprises a plurality of mobile station model numbers, each of said mobile station model numbers having each of said musical scores associated therewith, each of said ringing tone patterns associated with each of said musical scores being different for each of said mobile station model numbers.

30. The home location register of claim 29, wherein said mobile station has a select mobile station model number associated therewith, said select ringing tone pattern being associated with said select mobile station model number.

31. The home location register of claim 28, further comprising:

calculation logic for calculating each of said ringing tone patterns using said respective musical scores, said ringing tone logic storing each of said calculated ringing tone patterns within said database.

* * * * *

UNITED STATES PATENT AND TRADEMARK OFFICE
CERTIFICATE OF CORRECTION

PATENT NO. : 6,366,791 B1
DATED : April 2, 2002
INVENTOR(S) : Janette Chen Lin et al.

It is certified that error appears in the above-identified patent and that said Letters Patent is hereby corrected as shown below:

Column 4,
Line 18, delete "AN;4"

Signed and Sealed this

First Day of October, 2002

Attest:

JAMES E. ROGAN
Attesting Officer    Director of the United States Patent and Trademark Office